US000002004B1

(19) United States

(12) Statutory Invention Registration (10) Reg. No.: US H2004 H

Morrison (43) Published: Nov. 6, 2001

(54) ATTACHMENT APPARATUS

(75) Inventor: Edward F. Morrison, Burn Hills, NY (US)

(73) Assignee: The United States of America as represented by the United States Department of Energy, Washington, DC (US)

(21) Appl. No.: 09/135,060

(22) Filed: Aug. 18, 1998

(51) Int. Cl.[7] ..... F16B 39/12

(52) U.S. Cl. ..... 411/241; 411/237; 411/551

(58) Field of Search ..... 411/237, 239, 411/241, 221, 226, 223, 119, 120, 551, 553, 308, 999

(56) References Cited

U.S. PATENT DOCUMENTS

| | | | | |
|---|---|---|---|---|
| 1,432,050 | * | 10/1922 | Broderick | 411/237 |
| 1,450,048 | * | 3/1923 | Patterson | 411/226 |
| 2,390,325 | * | 12/1945 | Rapp | 411/551 |
| 2,403,247 | * | 7/1946 | Sullivan | 411/551 |
| 3,592,250 | * | 7/1971 | Petroshanoff . | |
| 3,927,503 | * | 12/1975 | Wilson . | |
| 4,534,101 | * | 8/1985 | Rosan . | |
| 4,938,644 | * | 7/1990 | Runels . | |
| 5,090,855 | * | 2/1992 | Terry . | |
| 5,190,423 | * | 3/1993 | Ewing . | |
| 5,314,279 | * | 5/1994 | Ewing . | |
| 5,362,187 | * | 11/1994 | Scalise . | |
| 5,439,337 | * | 8/1995 | Kakimoto . | |

FOREIGN PATENT DOCUMENTS

| | | | | |
|---|---|---|---|---|
| 517379 | * | 5/1921 | (FR) | 411/226 |
| 23570 | * | 10/1968 | (JP) | 411/239 |

* cited by examiner

*Primary Examiner*—Harold J. Tudor

(74) *Attorney, Agent, or Firm*—John T Lucas; William R. Moser; Paul A. Gottlieb

(57) ABSTRACT

The present invention includes an attachment apparatus comprising a rotation limiting member adapted to be threaded onto a threaded member; and a preload nut adapted to be threaded onto the threaded member. The rotation limiting member comprises a plurality of pins, and the preload nut comprises a plurality of slots, preferably wherein the plurality of pins and the plurality of slots are the same in number, which is preferably three. The plurality of pins of the rotation limiting member are filled into a corresponding plurality of slots of the preload nut to form a rotatable unit adapted to be threaded onto the threaded member. In use, the rotatable unit is threaded onto the threaded member. The present invention thus provides a unitized removable device for holes, including holes other than circular in shape, which have an established depth before an end of, or before an enlargement of the hole. The configuration of some exposed part of the device, or the head, is shaped and formed for its intended purpose, such as clamping, anchor points, eye bolts, stud anchor, and the like. The device allows for the installation, preloading and removal of all components of the device, as a unit, without damage to the member for which attachment is required by simple rotations of some exposed part of the device.

14 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VIEW A-A

VIEW B-B

VIEW F-11

VIEW F-10

ATTACHMENT APPARATUS

BACKGROUND OF THE INVENTION

1. Field of the Invention

This invention relates to mechanical fasteners, and more particularly to mechanical fasteners for unique applications. In this regard, the present invention relates to a device that provides unitized attachment and removal features into other than circular holes which enlarge after an established depth. More specifically, the present invention includes an attachment apparatus comprising a rotation limiting member adapted to be threaded onto a threaded member; and a preload nut adapted to be threaded onto a threaded member.

2. Description of the Related Art

Examples of conventional fasteners include:

U.S. Pat. No. 5,439,337, issued Aug. 8, 1995 to Kakimoto who reveals a lock nut where the nut closest to the bolt head and the intermediate nut are engaged with each other in only the peripheral direction.

U.S. Pat. No. 5,362,187, issued Nov. 8, 1994 to Scalise who describes a releasable locking fastener including a collar and resilient locking prongs with shoulders to anchor the bolt to a first member.

U.S. Pat. No. 5,314,279, issued May 24, 1994 to Ewing who represents a locking threaded fastener of the wedge action type.

U.S. Pat. No. 5,190,423, issued Mar. 2, 1993 to Ewing who illustrates a locking fastener with wedge elements therebetween for wedging the nut members apart when the threaded nut member is turned in the loosening direction.

U.S. Pat. No. 5,090,855, issued Feb. 25, 1992 to Terry who represents a locking fastener assembly with co-acting cam surfaces and locking means.

U.S. Pat. No. 4,938,644, issued Jul. 3, 1990 to Runels, and assigned to Eaton Corp., who depicts a bolt and nut lock assembly for releasably locking a bolt to an object.

U.S. Pat. No. 4,534,101, issued Aug. 13, 1985 to Rosan Jr. who portrays a method for installing a locking nut or bolt that includes drilling a bore to accommodate a fastener assembly.

BRIEF SUMMARY OF THE INVENTION

The present invention intended to be claimed includes an attachment apparatus comprising a rotation limiting member adapted to be threaded onto a threaded member; and a preload nut adapted to be threaded onto the threaded member.

The present invention intended to be claimed includes a rotatable unit comprising a rotation limiting member connected to a preload nut.

The present invention intended to be claimed also includes an attachment apparatus comprising a threaded member; a rotation limiting member adapted to be threaded onto the threaded member; and a preload nut adapted to be threaded onto the threaded member.

The present invention to be claimed also includes an attachment apparatus comprising a threaded member; a rotation limiting member threaded onto the threaded member; and a preload nut threaded onto the threaded member.

In accordance with the present invention, the rotation limiting member comprises a plurality of pins; and the preload nut comprises a plurality of slots, preferably wherein the plurality of pins and the plurality of slots are the same in number, which is preferably three.

In accordance with the present invention, the plurality of pins of the rotation limiting member are filled into a corresponding plurality of slots of the preload nut to form a rotatable unit adapted to be threaded onto the threaded member.

In accordance with the present invention, the rotatable unit is preferably threaded onto the threaded member; and preferably, the preload nut is capable of rotating about 60°.

The present invention provides means for attachment of a threaded fastener into an irregular shaped hole that has an established or predetermined depth. An important feature or element of the invention is the use of a rotation limiting means for a preload nut. In accordance with the present invention, the rotation limiting member and the preload nut are contoured to the shape of the hole into which the installation is to take place.

In addition, the apparatus of the present invention provides locking and unlocking by simple rotations of the preload means.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1A:
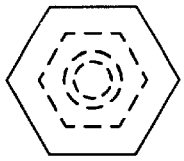
FIG. 1*a* is a view of the apparatus looking through the head (Section C—C of FIG. 1 *b*) of the threaded member.
Figure 1B:
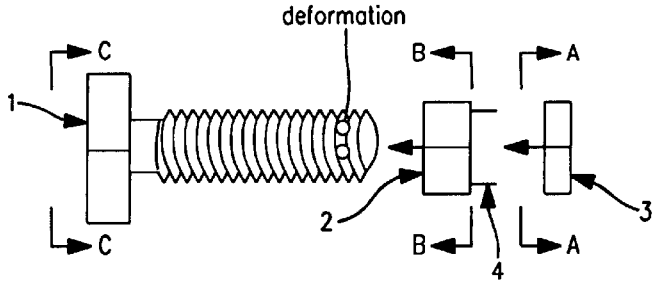
FIG. 1*b* is an exploded side view of the apparatus for a hexagonal hole application. (Note that the rotation limiting member and preload nut are in the unlocked (parallel) position.)
Figure 2:
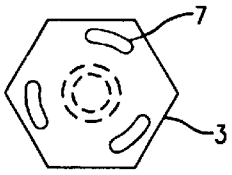
FIG. 2 is a top view (Section A—A of FIG. 1*b*) of the preload nut.
Figure 3:
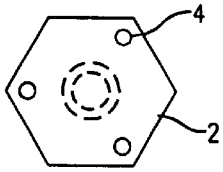
FIG. 3 is a bottom view (Section B–B of FIG. 1*b*) of the rotation limiting member.
Figure 5:
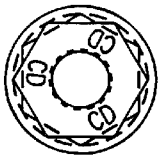
FIG. 5 is a top view (Section F-11 of FIG. 4) of the rotatable unit in the stalled apparatus. (Note that the rotation limiting member and preload nut are in the locked (perpendicular) position.)
Figure 6:
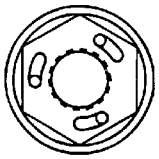
FIG. 6 is a top view (Section F-10 of FIG. 4) of the preload nut rotated 60° in the locked position.
Figure 4:
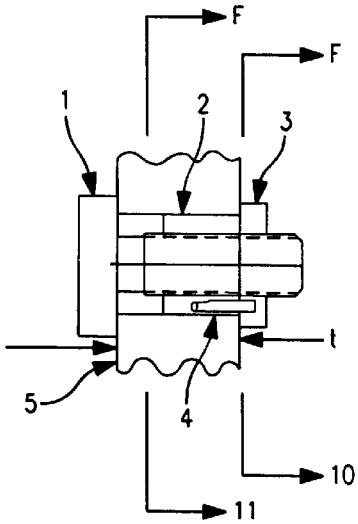
FIG. 4 is a cross section view of the installed apparatus.

The present invention intended to be claimed broadly includes an attachment apparatus comprising a rotation limiting member 2 adapted to be threaded onto a threaded member 1; and a preload nut 3 adapted to be threaded onto the threaded member 1.

More specifically, the present invention intended to be claimed includes an attachment apparatus comprising a threaded member 1; a rotation limiting member 2 adapted to be threaded onto the threaded member 1; and a preload nut 3 adapted to be threaded onto the threaded member 1.

Specifically, the present invention intended to be claimed includes an attachment apparatus comprising a threaded member 1; a rotation limiting member 2 threaded onto said threaded member 1; and a preload nut 3 threaded onto said threaded member 1.

In accordance with the present invention, the rotation limiting member 2 comprises a plurality of pins 4; and the preload nut 3 comprises a plurality of slots 7, preferably wherein the plurality of pins and the plurality of slots are the same in number, which is preferably three.

In accordance with the present invention, the plurality of pins 4 of the rotation limiting member 2 are filled into a corresponding plurality of slots 7 of the preload nut 3 to form a rotatable unit, adapted to be threaded onto the threaded member 1, which is a specified component of one of the previously described embodiments of invention, in which case the rotatable unit is threaded onto the threaded member 1. Preferably, the preload nut 3 is capable of rotating about 60°.

The material used in producing the attachment in this application was 304 stainless steel and machined from round, hex and bar stock as required. Readily manufactured parts, and other material may be substituted and modified for appropriateness for the application. Threaded portions and slots are made using conventional machining. Preload nut slots are sized to allow for interference fit of the pins into the slots. The pins could also be secured by welding or other suitable means.

The shape and dimensions of the head end of the threaded member are determined by the intended need of the fastener and the shape of the hole into which it will be installed.

The head end may be round, square, multi sided, an eye, a stud or other irregular shape. The length of the threaded section of threaded member 1 is determined by the thickness of the piece or depth of the hole into which the device is to be installed. The configuration of the rotation limiting member 2 and the preload nut 3 is determined by the shape and size of the hole. These parts will be made corresponding in shape and contour so as to fit into the mounting hole without resistance.

The number, size and location of dowel pin 4 and the machining of the slots 7 in preload nut 3 is again determined by the application.

In this hexagonal hole application, the pin/slot relationship provides the two desired positions for the rotation limiting member 2 and the preload nut 3 installation.

In using the apparatus of the present invention, the rotation limiting member 2 and the preload nut 3 are threaded onto threaded member 1 as a unit (rotation limiting member 2 on first) with approximately a 1/32" gap between them with the pin 4 of rotation limiting member 2 engaged in the slots in preload nut 3. A thickness (t) is established between the leading edge of preload nut 3 and the underside of the head of threaded member 1. This thickness is the depth of the hole plus approximately one sixteenth inch.

The thread immediately adjacent to preload nut 3 is then deformed to provide a feature so the rotation limiting member 2 preload nut 3 assembly will not come off. This feature also acts as a mechanical stop to provide the proper orientation of these parts prior to use. Rotation limiting member 2 and preload nut 3 are rotated back to this mechanical stop and the sides of these parts are held parallel. The assembly is now ready for installation.

The unit is installed and rotated clockwise. At the start of the rotation, the preload nut 3 rotates preferably about 60°. The corners of the preload nut start to engage the bottom of the hole (SECT F-11) because of the misalignment caused by the dowel pin slot relationship (SECT F-10). Further rotation starts to preload the underside of threaded member 1 to the mounting surface 5. Rotation of threaded member 1 is continued until the final desired torque and preload is applied.

The removal simply consists of the counterclockwise rotation of threaded member 1 which causes the preload nut 3 to rotate and automatically line up the sides of the preload nut parallel with rotation limiting member 2 for easy removal. The continued counter-clockwise rotation engages the preload nut with the deformed threads of threaded member 1 to assure perfect lineup for removal of the unit.

A feature unique to the present invention is the use of the configuration or contour of the hole as the part of the locking feature and the ability for removal of the device, as a unit, without leaving parts behind. Typically fastener designs for hole attachment are not removable as a unit and usually leave behind the locking portion.

The present invention is also advantageous in that the apparatus of the present invention is adaptable to remote installations. In addition, all parts of the apparatus of the present invention are removed from the hole after use, leaving the hole available for other uses, if desired. Also, the preloading capability of the device is limited only by physical size and standard stress levels.

Figure 7:
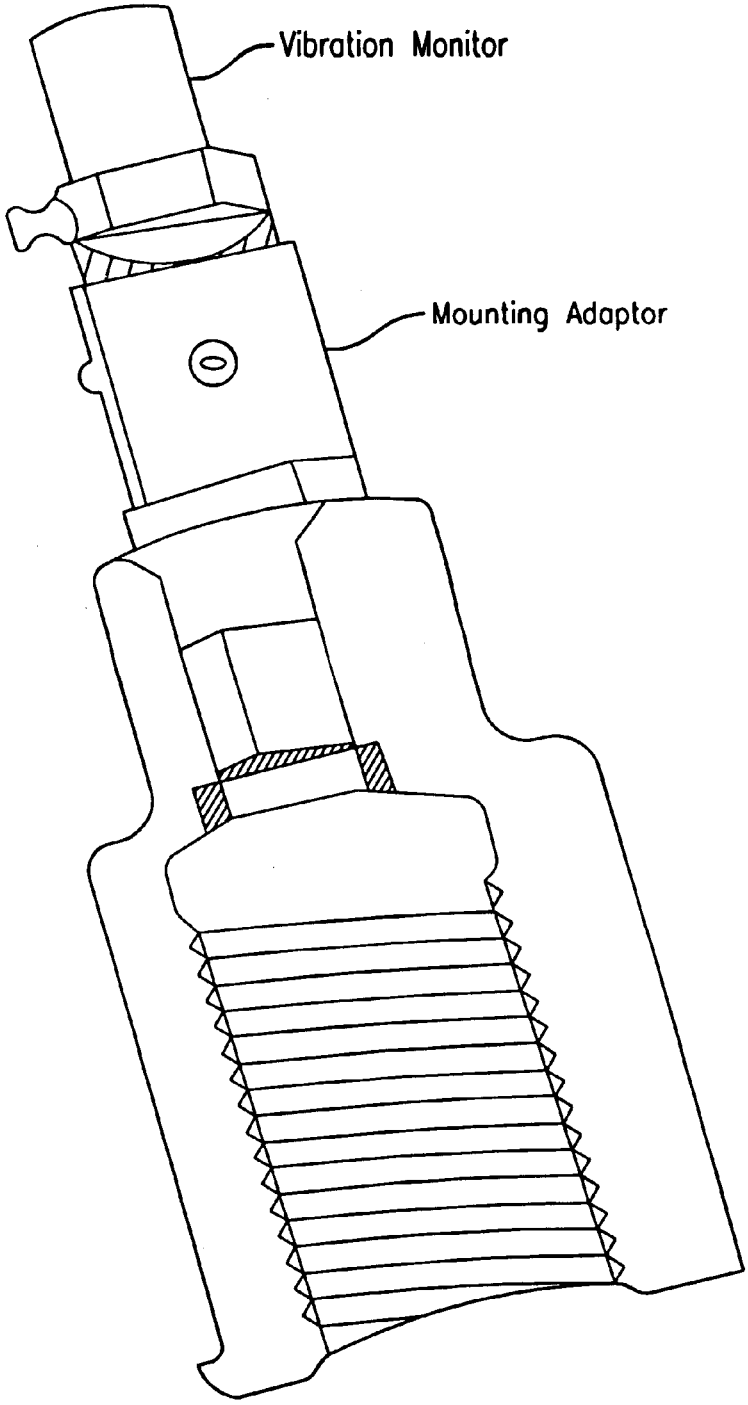
FIG. 7 shows a vibration monitor attached by a mounting adapter.

A vibration monitor may be attached to a component using a mounting adapter, as shown in FIG. 7.

Mounting adapters conventionally are designed to be universal or for a particular application. If high frequency data (>10 KHz) is desired from the monitor, then the mounting adapter should be welded or securely bolted to the component. In many applications, welding is not allowed and the component may be absent of any threaded holes or threaded stud protrusions. Magnetic adapters may be used on ferrous materials but the tradeoff is a reduction in frequency response (<2.5 KHz).

For purposes of the present invention, in this embodiment, the particular location is a nut that has been preloaded to a stud. The nut has an internal hexagonal hole above the threads which is smaller than the thread diameters. An installation tool for this nut uses the internal hexagonal configuration for installing the nut remotely from a distance away.

In accordance with the present invention, a unique adapter or device of the present invention was mounted on the top of the nut and preloaded to this top surface using the hexagonal hole configuration. This preloading capability provided the mechanical coupling necessary to achieve the desired frequency response.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

What is claimed is:

1. Attachment apparatus, comprising:

a) a threaded member;

b) a rotation limiting member adapted to be threaded onto said threaded member; and c) a preload nut adapted to be threaded onto said threaded member;

d) means for resisting said rotation limiting member and said preload nut from easy detachment from said threaded member.

2. The apparatus of claim 1, wherein said rotation limiting member comprises a plurality of pins; and said preload nut comprises a plurality of slots.

3. The apparatus of claim 2, wherein said plurality of pins and said plurality of slots are the same in number.

4. The apparatus of claim 3, wherein said plurality of pins of said rotation limiting member are adapted to be filled into a corresponding plurality of slots of said preload nut to form a rotatable unit adapted to be threaded onto a threaded member.

5. The apparatus of claim 4, wherein said rotatable unit is threaded onto said threaded member.

6. The apparatus of claim 5, wherein said number of the plurality is three.

7. The apparatus of claim 6 wherein said preload nut is capable of rotating about 60°.

8. Attachment apparatus, comprising:

a) a threaded member;

b) a rotation limiting member threaded onto said threaded member;

c) a preload nut threaded onto said threaded member; and d) means for resisting said rotation limiting member and said preload nut from easy detachment from said threaded member.

9. The apparatus of claim 8, wherein said rotation limiting member comprises a plurality of pins; and said preload nut comprises a plurality of slots.

10. The apparatus of claim 9, wherein said plurality of pins and said plurality of slots are the same in number.

11. The apparatus of claim 10, wherein said plurality of pins of said rotation limiting member are filled into a corresponding plurality of slots of said preload nut to form a rotatable unit adapted to be threaded onto said threaded member.

12. The apparatus of claim 11, wherein said rotatable unit is threaded onto said threaded member.

13. The apparatus of claim 12, wherein said number of the plurality is three.

14. The apparatus of claim 13 wherein said preload nut is capable of rotating about 60°.

* * * * *